(12) United States Patent
Johansson et al.

(10) Patent No.: US 6,459,190 B1
(45) Date of Patent: Oct. 1, 2002

(54) SWITCHED ACTUATOR CONTROL (75) Inventors: Stefan Johansson; Mats Bexell; Per Oskar Lithell, all of Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 0 days.

(21) Appl. No.: 09/637,794

(22) Filed: Aug. 11, 2000

(51) Int. Cl.⁷ .............................................. H01L 41/04
(52) U.S. Cl. ........................ 310/323.16; 310/316.01; 310/316.03; 310/317
(58) Field of Search ................... 310/328, 316.01, 310/316.03, 323.16, 317

(56) References Cited

U.S. PATENT DOCUMENTS

| 4,613,782 | A | * | 9/1986 | Mori et al. | 310/323 |
| 4,997,177 | A | * | 3/1991 | Mori et al. | 271/267 |
| 5,241,233 | A | * | 8/1993 | Culp | 310/317 |
| 5,245,242 | A | * | 9/1993 | Hall | 310/316 |
| 5,258,694 | A | * | 11/1993 | Ohnishi et al. | 318/135 |
| 5,563,465 | A | * | 10/1996 | Nakahara et al. | 310/328 |
| 5,739,621 | A | * | 4/1998 | Atsuta et al. | 310/316 |
| 5,814,919 | A | * | 9/1998 | Okumura | 310/323 |
| 5,920,144 | A | * | 7/1999 | Atsuta | 318/116 |
| 6,066,911 | A | * | 5/2000 | Lindemann et al. | 310/323.02 |
| 6,084,363 | A | | 7/2000 | Mizumoto | 310/316.01 |
| 6,133,671 | A | * | 10/2000 | Atsuta et al. | 310/316.01 |
| 6,177,753 | B1 | * | 1/2001 | Atsuta | 310/316.01 |
| 6,194,810 | B1 | * | 2/2001 | Chauvet | 310/317 |
| 6,278,223 | B1 | * | 8/2001 | Sasaki et al. | 310/328 |

FOREIGN PATENT DOCUMENTS

| DE | 44 08 618 | 9/1995 |
| DE | 198 14 594 | 10/1999 |
| EP | 0 112 454 | 7/1984 |
| JP | 61-139284 | 11/1984 |

* cited by examiner

*Primary Examiner*—Nestor Ramirez
*Assistant Examiner*—Peter Medley
(74) *Attorney, Agent, or Firm*—Young & Thompson (57) ABSTRACT

The present invention discloses an electromechanical actuator arrangement and a driving device for such an arrangement, having a plurality of drive element to be driven according to a wailing mechanism is provided. The driving device is characterised by an electrical power source (170) and at least two switches (172a, 172b) connected in series between the terminals (177) of the voltage source (170). An element terminal (178) is connected to a point (175) between said switches (172a, 172b), and a motor phase (174) of the actuator arrangement is connected to the element terminal (178). A control unit (171) is connected to control the switches (172a, 172b) in order to charge/discharge the drive elements. A charge control is thereby achieved by the use of the two switches (172a, 172b).

20 Claims, 6 Drawing Sheets

SWITCHED ACTUATOR CONTROL

TECHNICAL FIELD

The present invention relates to electromechanical actuators having non-dynamic or pseudo-static driving mechanisms and the control and driving of such actuators.

BACKGROUND

The small motor market has been increasing continuously for decades and there is a particular interest in high performance miniature motors that can be fabricated at low costs. Force and precision are the typical main properties of importance. Common electric motors have in some applications reached their limits and alternatives are being developed. This invention relates to the need for high performance miniature motors Electromechanical motors, comprising e.g. piezoelectric motors, is a more and more used type of miniature motors. Piezoelectric actuators are today well known and used in a wide variety of applications. Piezoelectric actuators are generally characterised by a high momentum but a small stroke. By repeating the motion with a high frequency, macroscopic strokes can be achieved. There are a number of fundamentally different operation mechanisms used in electromechanical motors. By using the inertia of some motor component and/or time dependent physical effects, various electromechanical motors can be realized. This group of driving mechanisms may be referred to as dynamic driving mechanisms. Typically, motors with dynamic driving mechanisms can only operate in a certain frequency range, while no operation at low internal speed or frequency is possible. The commonly encountered names ultrasonic and travelling wave motors belong to this group of dynamic driving mechanisms.

Another group of driving mechanisms can be denoted as non-dynamic, static or quasi-static. These non-dynamic mechanisms are characterised in that the motion can be made at arbitrarily low frequencies or speed of the active elements. The driven component is moved by actuator elements which typically make motion cycles such as grip, move, release and return. When one set of elements is releasing, another set of elements will grip the driven component. Typically, the non-dynamic mechanisms are advantageous where controlled positioning is desired at low to medium-high speeds. Further this mechanism allows for easy optimisation in various applications and gives the possibility to deliver high forces. The main disadvantage is the high demands on the construction in order to achieve the desired mechanism. Various solutions to simplify the constructions without losses in performance are therefore generally of great commercial interest.

One mechanisms for non-dynamic motion is the "inch-worm" mechanism, first disclosed in the U.S. Pat. No. 3,902,084. The driven component is moved by mechanical steps in a clamp-extend-unclamp fashion, e.g. in U.S. Pat. No. 5,751,090. There has to be at least two sets of clamping elements that move out of phase. In between each motion, the extention, the driven components is clamped by both sets of elements and stands still. The motion is cyclic and the ultimate resolution corresponds to one step length divided by the voltage resolution. The driven component can in some cases be stopped at fractions of the full step length, a kind of micro-step mode. The clamping and unclamping takes place during a non-motion phase.

In the international patent application WO 97/36366 a piezoelectric motor based on a non-dynamic driving mechanism is disclosed. The mechanism is an alternative to the "inch-worm" mechanism and could be denominated a "mechanical stepping mechanism". The motor is made of an electromechanical material as a monolithic multilayer unit with at least two independent sets of drive elements that can move two-dimensionally. The motion of each set is characterised by the four sequences of gripping, moving, releasing and returning. Voltages cycles are applied to the sets of bimorph drive elements, which are out of phase with each other. In the application the preferred voltage cycles were stated to be sinusoidal.

Prior art non-dynamically driven electromechanical motors exhibit large advantages. However, some minor disadvantages are still present. The drive elements typically have a strong coupling between supplied/removed charge and the mechanical shape changes. One way in prior art to control the voltages over the drive elements is to connect a voltage amplifier connected substantially directly to the drive elements. In this amplifier circuit, the drive elements are driven by voltage control, which from the drive elements capacitance point of view is electrically analogous to a closed circuit. If a force is applied on the drive element, the electromechanical material will give rise to a voltage or current. A closed circuit will compensate for this by adjusting the voltage to the requested value. In practise, this means that the efficient Youngs modulus of the electromechanical material will be quite low due to the strong coupling between the mechanical shape and the low impedance of the amplifier allowing the electrical charge to be removed without noticable resistance. A higher Youngs modulus is normally advantageous since higher forces, higher frequencies and smaller sizes can be accomplished, Furthermore, the size of an amplifier circuit is often quite large, when discussing modem electronics, and since electromechanical motors often are used in miniature applications, this size can correspond to a substantial part of the total size. The power dissipation of an amplifier circuit is typically relatively large, which influences the need for cooling arrangements. This results in larger size motors. Amplifier cirucits are also relatively costly.

In ultrasonic motors the wear of the contact surfaces is a non-negligible problem. Several solutions to the problems have been suggested including polymer surface and lubrication. The wear of a non-resonant motor is less due to the more controlled motion of the drive elements. However, when high performance miniature motors are considered, also a minor wear might affect the performance.

There are numerous ways to make piezoceramic motors according to the present invention but with prior art solutions it is difficult to achieve small size, high forces and low price at the same time.

SUMMARY

A general object of the present invention is to provide an improved control device and control method for electromechanical motors, having a non-dynamic or pseudo-static driving mechanism. A further object is to increase the apparent Youngs modulus for the material in the drive elements. Another object is to provide a motor, which is smaller, withstands higher forces and has less power consumption.

The above objects are achieved by devices and methods according to the enclosed claims. In general words, an electromechanical actuator arrangement and a driving device for such an arrangement, having a plurality of drive element to be driven according to a walking mechanism is provided. The driving device is characterised by an electrical power source and at least two switches connected in series between the terminals of the voltage source. An element terminal is connected to a point between said switches, and a motor phase of the actuator arrangement is connected to the element terminal. A control unit is connected to control the switches in order to charge/discharge the drive elements. A charge control is thereby achieved by the use of the two switches.

In preferred embodiments, inductive motor drive circuits are used, to which the capacitive load of the drive elements is connected. Drive elements may also be connected in parallel. Different resonance circuits are preferably also used.

The present invention changes the mechanical properties of the elements. The present invention enables small sizes and has a low energy consumption. The solutions is also relatively cheap.

BRIEF DESCRIPTION OF THE DRAWINGS

The invention, together with further objects and advantages thereof, may best be understood by making reference to the following description taken together with the accompanying drawings, in which.

DETAILED DESCRIPTION

Most actuator materials could be characterised as electromechanical materials, but in the present disclosure we intend materials that change their shape when an electric voltage or current is applied. Typical examples of electromechanical materials are piezoelectric, electrostrictive and antiferroelectric materials and these materials could be single crystalline as well as polycrystalline or amorphous. The materials of greatest interest today are polycrystalline multilayer ferroelectric ceramic materials with large electromechanical strains, but there is an ongoing development of polymer and polymer composite materials that might result in competitive properties.

Electromechanical motors and actuators, and in particular piezoelectric motors and actuators, are available in a huge number of varieties. One way to classify the devices is to divide them according to their driving mechanism. The features and problems of the devices are often specific for each group or sub-group. One solution applied to a motor device of a particular driving mechanism may be totally irrelevant for other types. In the present invention, electromechanical devices having a non-dynamic or pseudo-static driving mechanism are considered. For a better understanding of the common driving mechanisms, a brief report on different mechanisms is given at the end of specification. A common property of non-dynamic and pseudo-static mechanisms is that controlled quasi-static walking can be achieved and in the following references are made to "walking mechanisms".

A walking mechanism is thus characterised by two driving element sets that move a body sequentially by shape changes of the elements, utilising direct contact between the element and the body, and where the set in contact with the body operates quasi-statically.

In the present invention, an electromechanical motor or actuator comprises at least two sets of actuator elements. Each set comprises at least on element. The elements are preferably bimorphous elements being able to position its contact point in two independent directions. Preferably, the elements are parts of a monolithic body, as in WO 97/36366, but other solutions are also possible. First, the basic structure is described, then the manufacturing of such units will briefly be related, and finally the typical motion will be discussed more in detail.

Figure 1:
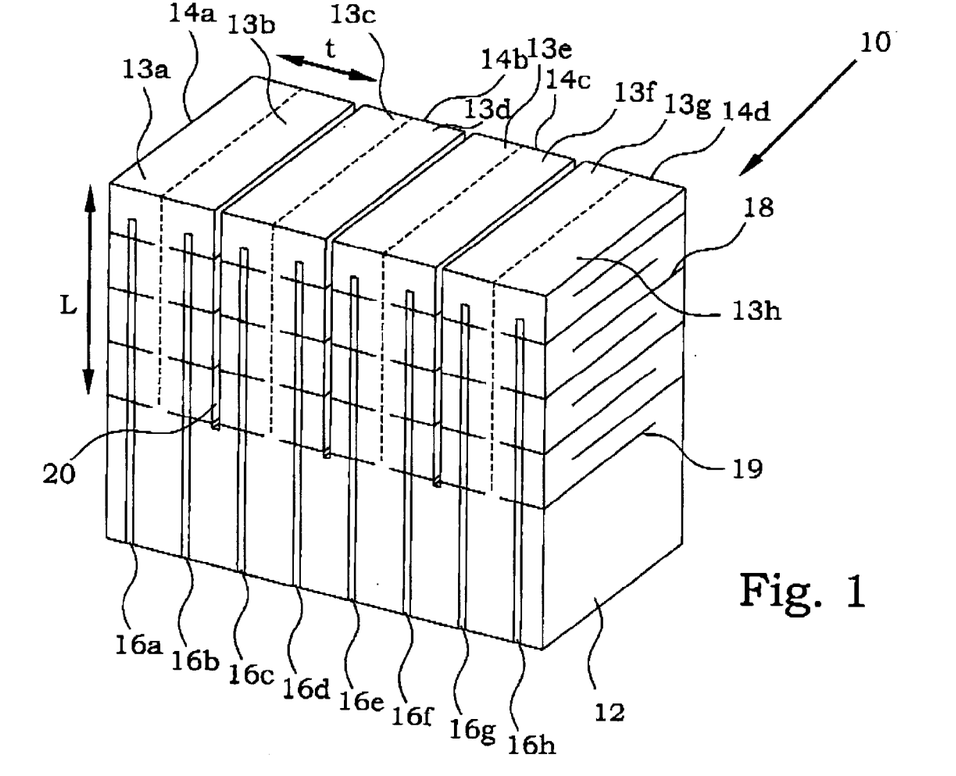
FIG. 1 is a schematic illustration of a monolithic piezoelectric drive unit that can be used in the present invention.

A monolithic multilayer unit 10 is shown in FIG. 1. The unit 10 comprises a passive backing 12 and drive elements, in this case four drive elements 14*a–d,* separated by cuts 20. Each drive element is divided into two separately controllable phase segments 13*a–h*. A number of phase electrode layers 19 and earth electrode layers 18 are incorporated within the drive elements 14*a–d,* and electrodes 16*a–h* contact the phase electrode layers 19 in the active areas in the drive elements 14. Each phase electrode 16*a–h* corresponds to one phase segment (13*a–h*). A similar contactation is present on the (not shown) rear side for the earth electrode layers 18. By applying a suitable voltage to selected electrodes 16, electrical fields will be applied within the drive elements and result in a expansion or contraction of the material between the phase electrode layers 19 and earth electrode layers 18. This will result in a bending and/or expansion/contraction of the drive elements 14. How this drive element motion is translated to a motion of an object in contact with the unit 10 will be described more in detail below.

The unit is possible to manufacture by prior art techniques, e.g. wet building of piezoceramic slurry combined with screen printing of electrode paste, but other manufacturing techniques might as well be used. In brief, the fabrication could be described as follows; On a glass plate, layers of a slurry consisting of piezoceramic powder, a binder, a dispersant and a solvent is cast with e.g. a doctors blade. The slurry is allowed to dry by forced convenction. Since the structure should be divided in a passive backing 12 and drive elements 14 the casting will be slightly different for these parts. The first layers will become the passive backing 12 and in the normal case there is no need for electrodes in this region so that another layer of slurry is cast on top of the previously cast and dried layer. The slurry is allowed to dry and the process is repeated until a sufficiently thick, typically about 1–3 mm passive backing is cast. In between the following layers, electrode patterns of e.g. Pt or AgPd paste will be screen-printed, using two different masks. One mask is used for the phase electrode layers 16 and another mask for the earth electrode layers 18 and they will be used alternatingly. The casting is typically made over a surface of some square decimeters and the masks could be aligned by centering pins. After the casting is complete the whole green body is divided in units 10 using e.g. a dicing saw and at the same time the division of drive elements 14 are made by cuts 20 with the same depth as the desired length of a drive element 14. The unit 10 is heat treated, first at some 600–700° C. to remove the organic material and then at about 1000–1300° C. to sinter the material to a monolithic unit. After sintering, e.g. silver electrodes 16 are printed on both sides. The eight electrodes 16a–h contact the phase electrode layers 16 in the active areas in the drive elements 14. The earth side is not shown but is analogous to the phase electrode side exept that all layers are connected. The drive elements operate as bimorphs and therefore there are two different active areas in each drive element 14, as indicated by a broken line. The silver paste is heat treated to form solid Ag electrodes 16 on the sides of the unit 10.

The mechanism for moving a driven component by such a unit is of a non-dynamic type. For a description, references are made to FIG. 2. Here the same type of unit 10 as in FIG. 1 is illustrated, but with certain details removed to simplify the readability. We can consider the monolithic unit 10 in FIG. 2 as consisting of two sets of driving elements that operate independently. Let us choose drive element 14a and 14c as the driving elements of the first set. These drive elements 14a, 14c are thus working synchronously. These drive elements 14a, 14c are in contact with a driven component, in this case a rail 22. Similarly, drive element 14b and 14d belongs to a second set. These drive elements 14b, 14d are thus also working synchronously. These drive elements 14b, 14d are not in contact with the rail 22 in the illustration. The drive elements 14 are bimorphs with independently controllable voltages on the two sides of the bimorph. The top of the drive elements 14, the contact points 28, can therefore move arbitrarily within a certain area, if no load is present. For an ideal bimorph and for small strokes, this area constitutes a rhombic. For a certain phase-shifted motion of the two sets of drive elements, a motion of the rail 22 according to the arrow 26 is possible to achieve.

Figure 3A:
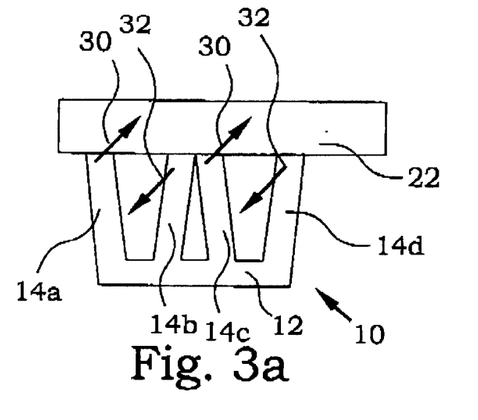
FIGS. 3a–d are schematic illustrations of a simple motion according to the present invention.

In the remaining part of the present disclosure, "rail" will refer to any body that is held against the drive elements in order to be moved relative to these drive elements. For applications, where a linear motion is requested, the "rail" is preferably substantially flat. However, for rotating applications, the "rail" may be curved and even have a circular cross section, The basic ideas of a motion are illustrated in the FIGS. 3a to 3d. All motions of the drive elements are exaggerated enormously in these figures in order to visualize the mechanism. In FIG. 3a, a situation when all drive elements 14 are in contact with the rail 22 is illustrated. The elements of the first set are bent to the left and the elements of the second set are bent to the right. From this situation, the elements of the first set, i.e. drive element 14a and 14c are forced in the direction of the arrows 30, i.e. in an upper right direction. The elements of the second set, i.e. drive element 14b and 14d are instead forced in the direction of the arrows 32, i.e. in a lower left direction. This means that the drive elements of the second set will loose its contact with the rail 22, and the rail 22 follows the motion of the contact points of the drive elements of the first set.

Figure 3B:
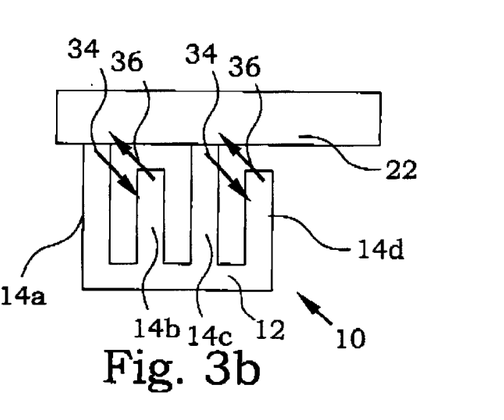

After some time, the situation in FIG. 3b is reached. The elements 14 are now changing its motion. From this situation, the elements of the first set, i.e. drive element 14a nd 14c are forced in the direction of the arrows 34, i.e. in a lower right direction. The elements of the second set, i.e. drive element 14b and 14d are instead forced in the direction of the arrows 36, i.e. in an upper left direction. This means that the drive elements of the second set eventually will come into contact with the rail 22 again.

Figure 3C:
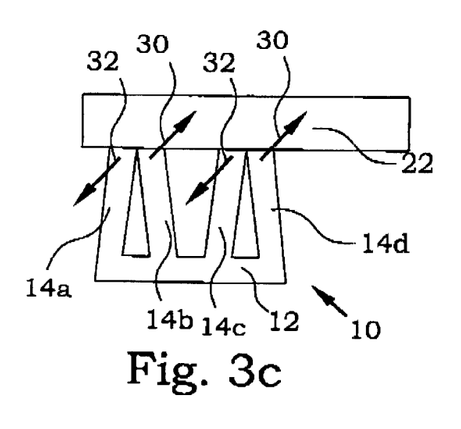

This situation is illustrated in FIG. 3c, i.e. all elements are again in contact with the rail 22, but the second set at a slightly different position. From this situation, the elements of the second set, i.e. drive element 14b and 14d are forced in the direction of the arrows 30, i.e. in an upper right direction. The elements of the first set, i.e. drive element 14a and 14c are instead forced in the direction of the arrows 32, i.e. n a lower left direction. This means that the drive elements of the first set now will loose its contact with the rail 22, and the rail 22 follows the motion of the contact points of the drive elements of the second set instead.

Figure 3D:
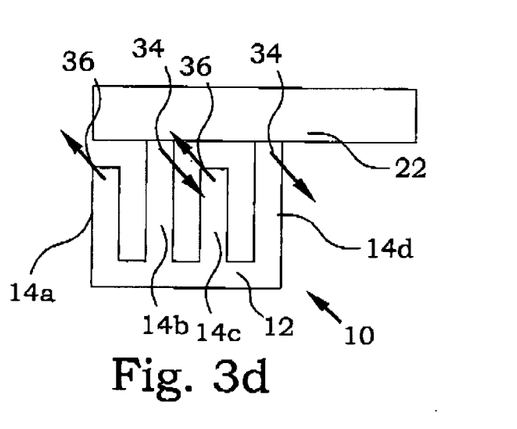

After some time, the situation in FIG. 3d is reached. The elements 14 are now changing its motion. From this situation, the elements of the second set, i.e. drive element 14b and 14d are forced in the direction of the arrows 34, i.e. in a lower right direction. The elements of the first set, i.e. drive element 14a and 14c are instead forced in the direction of the arrows 36, i.e. in an upper left direction. This means that the drive elements of the second set eventually will come into contact with the rail 22 again, and the cycle is repeated. The result will be a transportation of the rail to the right in the figure.

The four characteristic sequences of the motion is easily distinguished. At the situation in FIG. 3a, the drive elements of the first set are in their gripping sequence. The moving sequence takes place between the FIG. 3a over FIG. 3b and to FIG. 3c. At the situation in FIG. 3c, the drive elements of the first set are in their releasing sequence. Eventually. The moving sequence takes place between the FIG. 3c over FIG. 3d and to FIG. 3a. In theory, the gripping and releasing sequences could be almost indefinite short, but in reality, the gripping and releasing takes place during a certain time period.

Figure 2:
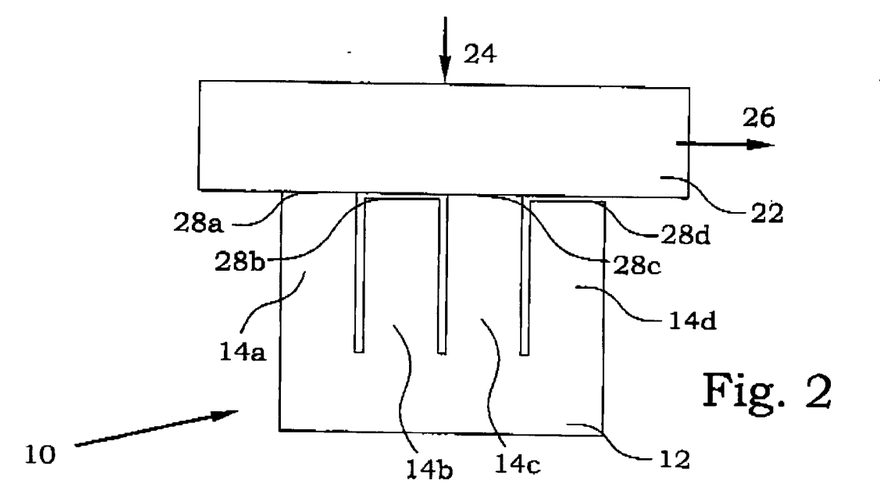
FIG. 2 is an illustration of how a drive unit of FIG. 1 is arranged for driving a body.

The common way to make a motor as in FIG. 2 is to apply a normal force 24 in the normal direction. In the following, linear motion 26 will mostly be used to exemplify the invention, but it is obvious that most of the solutions can be used in rotating, linear-rotating and linear-linear motors etc. Often a three point contact is desired in a rotating motor and therefore a typical rotating drive unit according to the non-dynamic drive mechanism will consist of six drive elements. However for both linear and rotating motors it is possible to use four, or which ever number larger than one, elements to get the desired drive mechanism provided that the guiding allows one set of elements to move freely when the other is holding the driven component.

The examples above are based on two sets of drive elements, typically phase shifted by 180 degrees. One may also use more than two sets of drive elements. One possibility would e.g. be to use three independent sets of drive elements, phase shifted by 120 degrees. Such an arrangement would give a situation, where two sets are in contact with the body to be moved during most of the time, while one is in a returning sequence. A higher force can thus be achieved, at the expense of more complex electronics and mechanical designs.

The size of the elements are choosen with respect to the application and the main factors to consider are the necessary drive element elongation, drive element step lenght and the load to carry. The elongation is determined by factors such as flatness and roughness of all drive surfaces as well as elastic deformation of all mechanical parts. With a rail flatness of 0.25 µm, a drive unit flatness of 0.25 µm and an elastic deformation of 0.50 µm the elongation should be larger than 1.0 µm and typically about 2.0 µm will be sufficient. Using materials with are able to achieve electromechanical strains of 0.07% at maximum operating voltage allowed, the length of the elements have to be at least 3 mm. The elements can be regarded as bimorphs, and if we in FIG. 1 consider e.g. element 14a, one side of the bimorph can be activated with Ag electrode 16a and the other with Ag electrode 16b (assuming that the earth electrodes are connected). The bimorph bending using one active side can be calculated from:

$$w = \frac{3L^2 s}{4t} \quad (1)$$

where L is the length of the drive element, t is the total thickness of the bimorph and s is the strain the activated layer can reach, as indicated in FIG. 1. With a thickness approximately as the length, the resulting bending motion will be approximately 1 µm in both directions which gives a step length of about 2 µm.

In electromechanical motors operating with walking mechanisms there is a possibility to make benefits of fine controlled motion. The motion is created by at least two sets of drive elements, of which at least one set is in contact with the body to be moved at each instant. This opens up for a possibility to halt the stepping cycle at any occasion even within a single step. By controlling the voltages, steps of different sizes or motion characteristics can be obtained. A fine walking can thus be achieved by proper electronics control. As has been commented previously, this invention is applicable to various types of non-resonant motors (rotating, linear, linear and rotating etc.) with two or more driving elements. With fine walking is intended real-time fine control of either position, velocity or acceleration or preferably all at the same time. This should be interpreted that the position, velocity and/or acceleration can be fully controlled by the drive electronics in every instant (within the time resolution given by the control circuit).

In motors based on a walking mechanism there will be at least two different element sets with two different phases driving the elements in one set. One motor phase typically corresponds to one phase segment 13a–h (FIG. 1) of each drive element in a set. Normally a motor is driven by four phases, even though a motor could be driven by e.g. two or eight phases as is further described below. As an example, one phase could have a trapetzoidal shape if the charge of the phase is plotted as a function of cycle period. Typically the other phase in the same set is phase shifted a quarter of a period and the remaining two phases in the other set is phase shifted half a period relative to the two phases in the first set. In some cases the phases might also differ in charge level. In the general case, all phases might have completely different waveforms. In the below description, when referring to a motor phase, the charge of one or several phase segments are typically intended.

There are several solutions for the electronics available to be able to make the controlled fine walking. Most applications are cost sensitive and two different solutions are preferred. One is to generate the desired waveform description digitally. A digital/analogue converter and amplifier is then used to create the corresponding voltage waves. The other is to use electric switches and connect the motor phases with other electric components such as resistors and inductors to create the waveform segments. The switches are typically controlled by digital electronics, but the digital parts in some applications are extremely simple. The first solution for drive electronics will be called amplifier circuit and the latter a switched circuit and the various solutions for motor drive will be described below.

Figure 4:
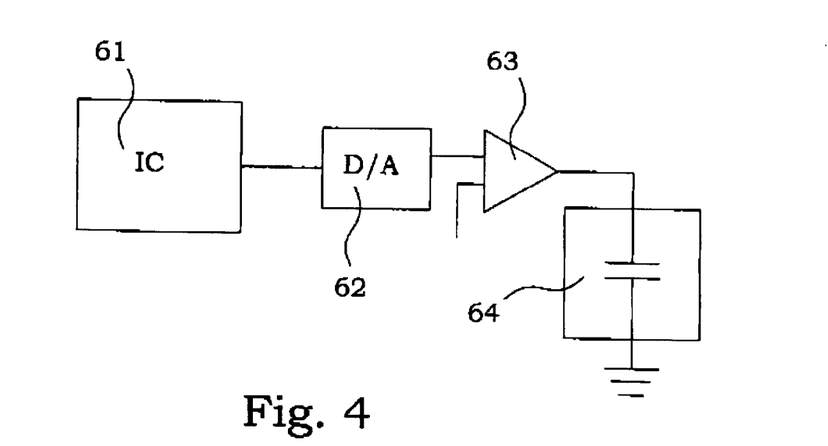
FIG. 4 illustrates an amplifier electronic drive device usable for driving piezoelectric elements.

One embodiment of an amplifier circuit is given in FIG. 4. A linear amplifier 63 drives a motor phase, illustrated as a capacitor 64. The linear amplifier 63 is in general a circuit in itself. Preferably, the amplifier 64 has a built in or external low-pass filter to avoid resonance in the motor or other component. The linear amplifier is driven by a digital to analogue converter 62, which gets the digital definition of the voltage wave from a integrated circuit 61. The IC is preferably a programmable logic circuit such as a FPGA (Field Programmable Gate Array) to make it easier to optimize motors for each application. The choice of voltage control of the motors has several advantages, including stability and simplicity. One important advantage is that the circuit can be used to damp various unwanted motion modes since the motor phase can be considered connected in short-circuit at a given voltage. By proper choice of impedance of the amplifier, various undesired motion modes can be damped. The parallel architecture of a FPGA makes it easy to run complicated optimization sequences, where all phases has to be changed each cycle or even oftener. The economical circuits available today are able to drive a motor at a cycle frequency of 100 kHz with a cycle resolution of more than 256 micro-steps per cycle. This corresponds to a clock frequency of about 25.6 MHz. The voltage definition could be made much better, and will not limit the resolution of the motor. With a clock frequency of one magnitude larger, which is possible today for a slightly higher cost, the micro-step resolution will improve with an order of magnitude. Also a reduced maximum operating frequency will improve the microstep resolution.

The ultimate resolution will be determined by the relative voltage resolution related to the maximum step length. For example, with a maximum step length of 1 µm at 50 V, a 12-bit voltage resolution corresponds to an ultimate positioning resolution in the A range (12 bits for half a step). In the micro-step mode the resolution will be twice the step length times the cycle resolution, since there are two steps per cycle. To optimize the resolution the reduced step length is preferably chosen to compensate for differences between cycle and voltage resolution. With a cycle resolution of 12 bits, the step is divided in 11 bits and in order to optimize the positioning resolution for a voltage resolution of 12 bits the step length should be reduced with a factor of 4. It is also possible to define steps with reduced step lengths close to the ultimate resolution, which is advantageous when creep and other undesired motions should be reduced to a minimum. Generally, creep etc. are fractions of the full stroke and with reduced stroke undesired motions are decreased.

In an amplifier circuit, the motor is driven by voltage control, which from the piezoceramic mechanical properties point of view is analogous to a closed circuit electrically. The electromechanical behaviour of a piezoelectric material changes with open- or closed-circuit drive arrangements, and in practice parameters such as the Youngs modulus change. A closed-circuit drive arrangement may give a piezoelectric material a Youngs modulus, which is up to two times the one for an open-circuit drive arrangement. This can be regarded as a result from the strong coupling between the shape of the piezoceranmic and supplied/removed charge. If the charge can move easily, e.g. a short circuit; there will be no counteracting charge build up if the material is deformed. The material behaves mechanically less stiff. An increased Youngs modulus, i.e. an increased stiffness, increases the maximum possible quasi-static frequency that can be used with the piezoelectric actuator element. A higher frequency increases the maximum velocity of a motor. For a bimorph element, it also increases the bending force. The maximum bending force when activating one side of the bimorph is:

$$F = \frac{3Ybt^2s}{16L} \quad (2)$$

where Y is the Young's modulus, b is the width of the bimorph, s is the strain of the material, t and L are the thickness and length of the bimorph as previously. From this relation, it is easily realised that a smaller Young's modulus has to be compensated by increased element dimensions, in order to reach the same bending force with the same strain s and length L.

Other disadvantages with amplifier circuits are the size and the relatively large power dissipation. In many applications the total size of motor and drive electronics is important and the use of space-requiring amplifier circuits may be disadvantageous. A relatively high power loss in an amplifier circuit requires furthermore large electrical components and a large size of components to handle heat dissipation. However, the amplifier solution is despite the above disadvantages and its costs a good choice for demanding applications regarding resolution and motion control.

For other applications, where e.g. size and force are important, other drive solutions have to be used. Switched circuits are common as drive circuits for motors with inductive load (such as stepping and AC-motors). Previously, drive circuits based on switches have not been considered for motors with capacitive loads. There are several reasons for this and maybe the apparent incompatibility between current controling circuits and, as normally considered, voltage controlled piezoelectric components, might be the most important. However, there are several advantages with a switched circuit even for piezoelectric motor control, as will be presented below. A switched circuit can be considered as a charge or current generator, and in this case the piezoceramic elements are regarded as connected in open circuit. The electromechanical behaviour of the piezoelectric material may therefore be improved considerably, as discussed above. An increased stiffness of the piezoelectric material opens up for a reduced size, or a cheaper or more resistant selection of piezoelectric material. The power consumption of switched circuits is mainly connected to the charge or current that is fed through the circuit. Since the switches themselves consume extremely low power, the total power consumption is low. The smaller power loss in a fast switch allows for smaller electrical components and reduced size of components to handle heat dissipation. Small physical dimensions are often advantageous in this field.

The possibility of obtaining micro-step resolution if the same order as an amplifier circuit is highly dependent on the switch characteristics. An on/off time in the order of ns or faster combined with high gate impedance, high current and voltage capacity is desired. For simple applications, switched circuits are already the preferably choice. The development of switching components will, however, soon make the switch circuits competitive for most applications. There are various solutions to get sufficient control of the drive element motion without the use of too sophisticated circuit solutions. Some preferred embodiments are presented below.

Figure 5:
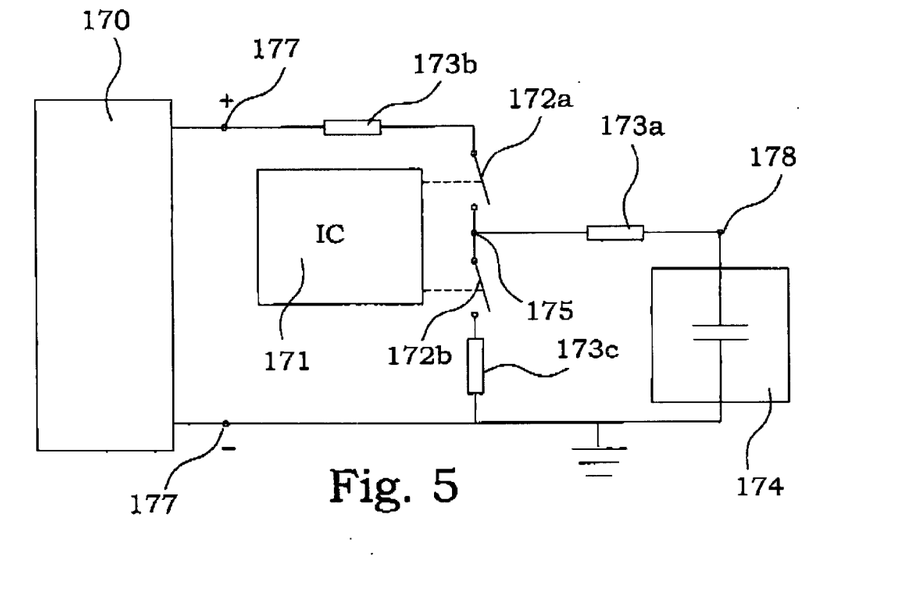
FIG. 5 illustrates a switched electronic drive device according to the present invention usable for driving piezoelectric elements.

In FIG. 5 a schematic description of such a switched circuit is given. A drive voltage, illustrated by the "+"-sign, is provided at a terminal 177 by an electric power supply 170 in a conventional way and is not further discussed. One motor phase, illustrated by a capacitance 174, is connected in series with a resistor 173a. Two switches 172a and 172b are alternatively switching the voltage level at point 175 between the positive drive voltage and earth. In between power and ground and the two switches 172a and 172b are shown other possible resistor arrangements, 173b and 173c. Since most components, e.g. the piezoceramic capacitance has an associate equivalent series resistance it is not necessary to have the resistors 173a–173c in some cases. There is also the possibility to get different charging time by using different resistance values in e.g. 173b and 173c. The voltage over the motor phase 174 will follow typical RC-charging and decay and will therefore depend on the opening times of the switches 172a, 172b. If switch 172a is closed, a current will flow from the drive voltage and charge the a motor phase 174, increasing the voltage. If switch 172b instead is closed, a current will flow from the motor phase 174 to earth, discharging the motor phase 174 and thereby decreasing the applied voltage. A control unit 171 is provided to control the switches 172a and 172b. This control can be designed according to the specific application, and the control unit 171 is preferably digital and programmable. Typically a microprocessor is used to control charging and discharging of the motor phases.

With a proper choice of resistances 173a–c, the power loss in the switches can be kept low, minimising the size of components. For simple applications with rather low requirements on controllability and resolution, the resistance is typically chosen so that the motor phase 174 will reach 90–95% of full charge at the time of one sequence (grip, move, release and return). A motor, e.g. the one shown in FIG. 2, may be run with simple sequences according to FIG. 6. Here, the motion of the tip of a bimorph, having two phases, is illustrated. If we start with no charge in any phase of the bimorph, a drive element will be in position 82a. After charging of one phase, the drive element will be able to reach, at least close to, position 82b. By charging the other phase in the same drive element, position 82c can be reached and by discharging in the right sequence, the drive element can move along the outer trajectory 81. Fine walking can be accomplished with control of the time the switch is open.

Figure 6:
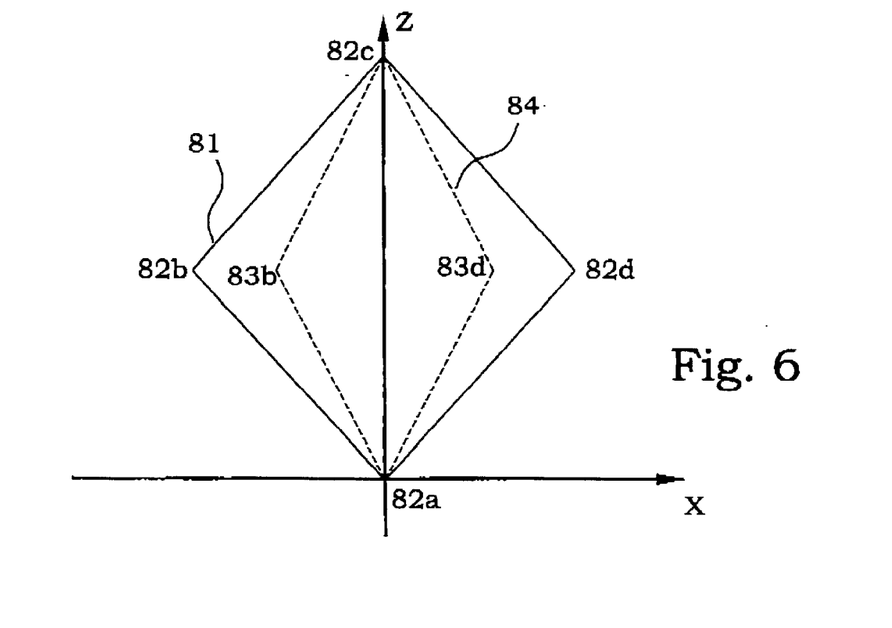
FIG. 6 is a diagram illustrating motion trajectories.

A reduced step length with a switched circuit can be accomplished by incomplete charging of the proper motor phase in a sequence such as e.g. 82a to 83b or 82c to 83d. Micro-stepping is accomplished by controlling the charging time so that a segment in the trajectory 84 is divided in fractional portions. A microprocessor 171 is preferably used to control charging and discharging of the motor phases. Since charging and discharging is non-linear with respect to time the motion is typically not as ideal as the one accomplished with the amplified circuit, but is for many applications sufficient. The motors have to be run in the given frequency interval used for dimensioning resistances etc. to perform best.

Figure 7:
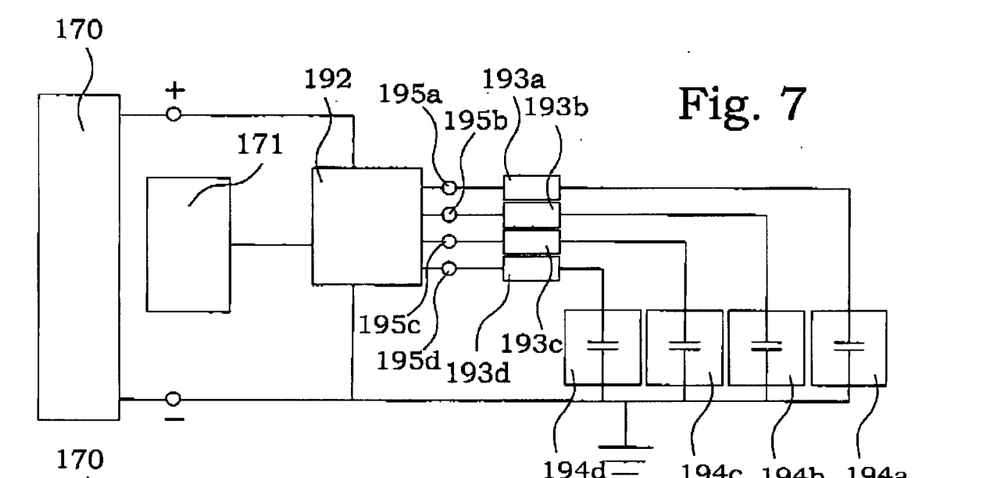
FIG. 7 illustrates an embodiment of a switched electronic drive device based on a standard motor drive circuit.

One special embodiment is illustrated in FIG. 7. Here, a standard motor drive circuit 192 is used to drive piezoelectric motors. Such a standard motor drive circuit 192 is adapted to control a current between pairs of terminals. Thus, normally, an inductive load is connected between the terminals. Various types of motor drives exist and the main demands for the special use with piezoelectric drives are the possibility of sufficient frequency and current capacity.

In this embodiment, the motor drive circuit 192 has two pairs of terminals 195a, 195b, and 195c, 195d. Instead of connecting inductive load between these terminals, motor phases 194a–d, illustrated by capacitive loads, are connected between each terminal and ground. Typically, the motor phases 194a–d are connected in series with resistors 193a–d, in order to have full control of the charging conditions. The motor drive circuit 192 is supplied with a driving voltage of an electric power supply 170 and is connected to ground. A control unit 17I controls the operation of the motor drive circuit 192. Upon request from the control unit 171, the motor drive circuit 192 provides a current through selected ones of its terminals. The respective motor phases 194a–d are thereby charged or discharged, depending on the direction of the currents. A similar behaviour as described before is achieved, using a drive circuit with a completely different intended use.

The phase shift between the phases in each element set could be fixed 90 degrees or could be controlled to have other values which gives an alternative method for reducing the step length. With a phase shift of less than 90 degrees the drive element will move less in the x-direction as compared to the trajectory 181 for a phase shift of 90 degrees. The timing control is often build into the motor drive circuit and with the use of the simple control unit 171, the piezoelectric motors could be optimised for various applications where fine walking is necessary. Motors can be operated as explained below in 8 and 4 phase arrangements, of which the latter is more suitable when standard motor controllers are used. There is also the possibility to make 2-phase motors, where the two phases have phase shifts between 0 and 180 degrees.

Figure 8:
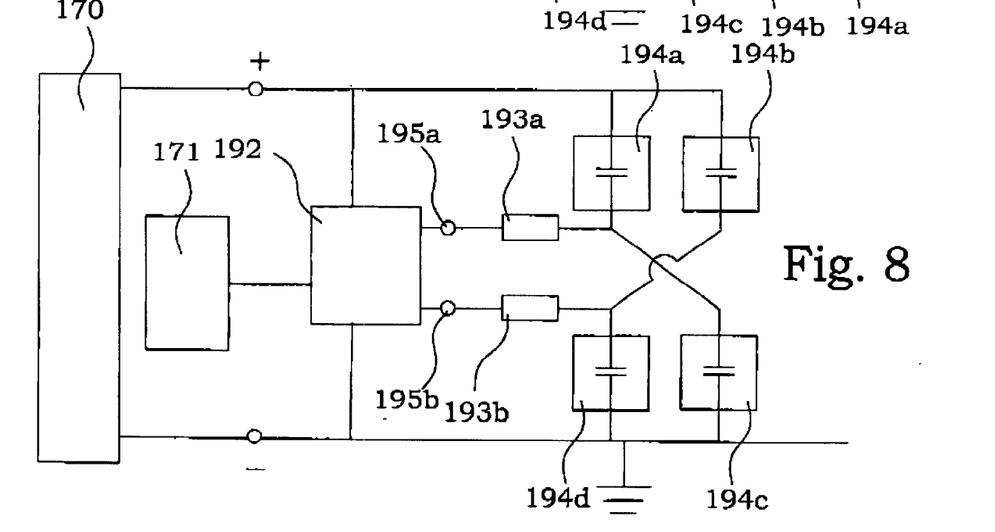
FIG. 8 illustrates another embodiment of a switched electronic drive device based on a standard motor drive circuit.

In a preferred embodiment of a two-phase motor, illustrated in FIG. 8, the motor control unit 171 should allow for adjustable phase shifts and it should be possible to supply the positive voltage directly to two of the motor phases. Motor phases of the same element are 194a and 194b or 194c and 194d. The current limiting resistors 193a–b can in this embodiment be used for two phases at the same time.

Figure 9:
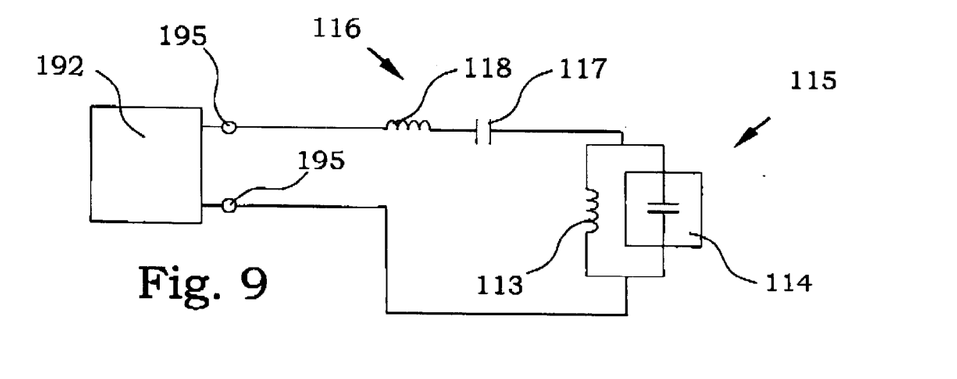
FIG. 9 illustrates the use of resonance circuits in the present invention.

The power consumption of a motor driven by a switch circuit can be reduced by creating electric resonance circuits. In FIG. 9, the capacitance of one phase 114 in a motor drive element can be connected in parallel with an inductance 113, forming a parallel resonance circuit 115. The two phases in a motor that normally are phase shifted 180 degrees can be connected in series. In this case the motor phase 114 is exchanged with two motor phases in series and earth is connected in the middle between the motor phases. The parallel resonance circuit 115 will have a maximum impedance at the resonance frequency and at this frequency the power loss is minmized. The voltage over the capacitance 114 of one motor phase will be sinusoidal and perfect fine stepping is difficult to achieve. On the other hand the phase difference between the two different phases in each drive element can be adjusted to reduce the step length to the desired position resolution. The efficiency can be further improved by filtering an incoming square wax voltage to the parallel resonance circuit with a series resonance circuit 116 consisting of an inductor 117 and a capacitance 118. The resonance for the two circuits 115, 116 should be the same. It is advantageous to use similar components to reduce changes due to thermal drift. The capacitors could be of the same material as the motor elements and be assembled to keep the same temperature as the motor elements.

Figure 10:
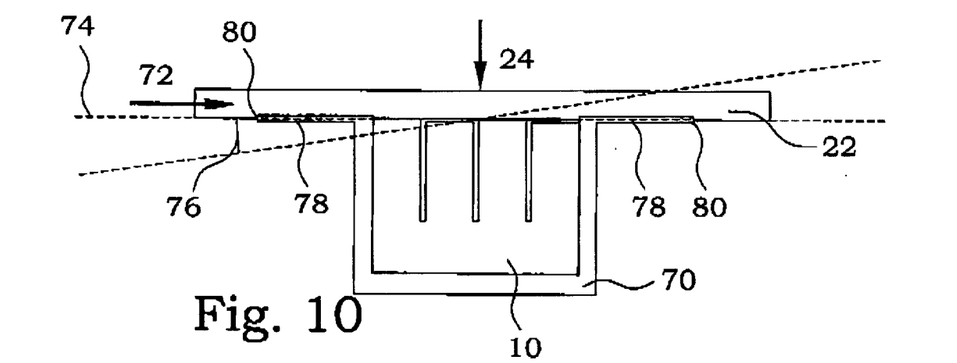
FIG. 10 illustrates an embodiment of a preferred mounting of a drive unit.

There are numerous ways of building operating motors with monolithic drive units such as the one shown in FIG. 1. Two particular cases can be distinguished, significant or negligible loads, and the mechanical solutions for these cases will be further explained below. The non-dynamic mechanism used in the present invention puts particular demands on mechanical stability during operation. All drive element (contact points) have to be able to get in contact with the rail at the predetermined position. If we consider a rail that is guided in such a way that the maximum angular error 76, illustrated by a broken line in FIG. 10, is small enough to allow controlled operation of the motor, the main demand will be on the details creating the normal force N 24 when a tangential force T 74 is applied. If a spring 78 is used, a tangential force might rotate a mounting module 70, in which the monolithic actuator unit 10 typically is fixed. The mounting module 70 could be made of steel or other robust materials. If the springs 78 have a mounting point 80 on or close to the contact plane 74 between the monolithic actuator unit 10 and the rail 22, the rotation of the mounting module 70 will be greatly suppressed. Preferably, the whole spring 78 should be placed in the contact plane 74. To keep control of position in the tangential direction the spring 78 should have as anisotropic properties as possible, i.e. sufficiently soft in the normal direction and as stiff as possible in the tangential directions.

Figure 11:
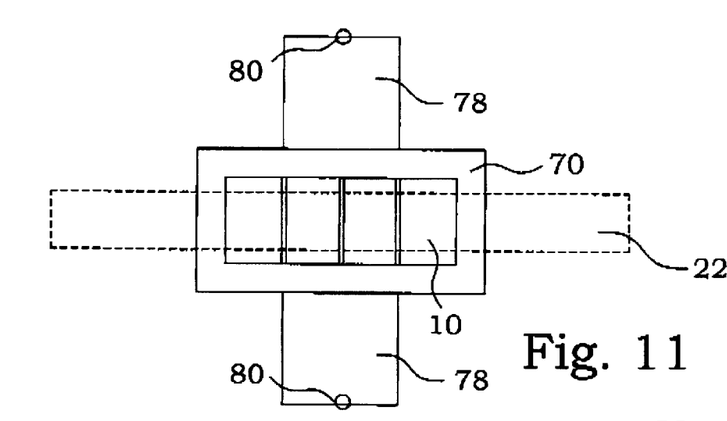
FIG. 11 illustrates a top view of an alternative mounting of a drive unit.

One example of how to achieve desired normal forces and at the same time high stiffness in the tangential direction is to use a flat spring 78 in or close to the contact plane. Another desired property of the spring 78 is the ability to align the module against the rail automatically. It is preferable to mount the whole mounting module 70 and spring 78 into a machined house and get operation without any adjustments. This can be achieved with the springs 78 given in FIG. 10. The bending stiffness of e.g. flat springs 78 in the contact plane 74 can be adjusted so that the contact points of the drive elements in the module will be able to align themselves parallel to the rail surface, i.e. the spring will have auto-aligning properties. In FIG. 11, a mounting module 70 with springs 78 is shown in a top view, with the rail 22 indicated with broken lines. The mounting points 80 are in, or close to, the contact plane but placed orthogonal to both the normal and tangential direction of the rail 22 motion and preferably symmetric with respect to the mounting module 70.

What should be emphasised once again is that several different monolithic units can be used, which gives advantages in various applications. In these last examples, a unit consisting of four drive elements, where the bimorph phases are place orthogonal to the ones shown in FIG. 1, could advantageously be used. The drive element would then tilt sideways instead of lengthways and the module could be oriented orthogonal to the rail instead of parallel. The module would in such a case be less sensitive to tilting errors of the kind exemplified in FIG. 10.

Figure 12:
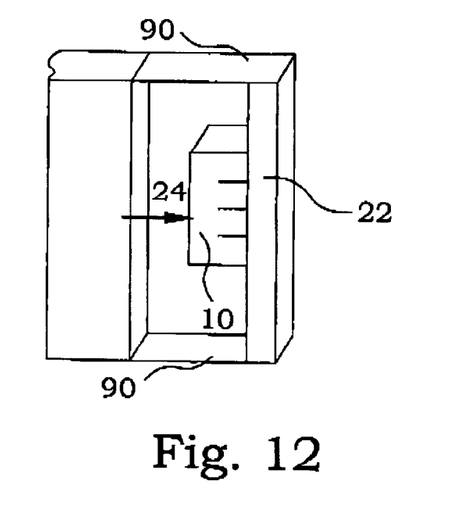
FIG. 12 illustrates a motor arrangement suitable for small strokes.
Figure 13:
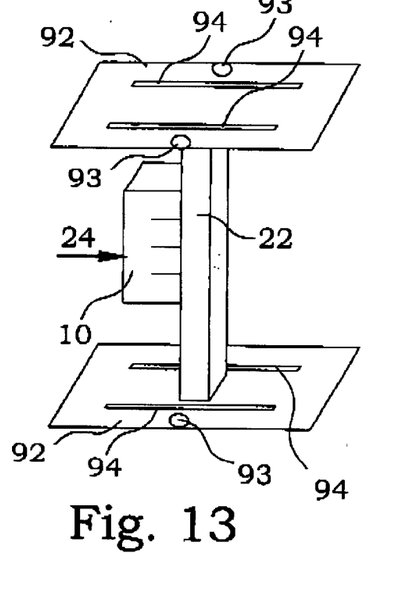
FIG. 13 illustrates another motor arrangement suitable for small strokes.

A simple guiding of the rail for small strokes is constituted by an arrangement of parallel springs, i.e. double-cantilevers. It could be either two parallel cantilevers 90 as exemplified in FIG. 12, where a unit 10 is pressed against the rail 22 with a normal force 24, creating a reaction force by the expansion of the spring in the normal direction. The force necessary to bend the cantilevers is much smaller and allows for small to moderate strokes depending on spring length. Another version to reduce the motion in the normal direction is to use antagonistic arrangements as in FIGS. 10 and 11 or to make symmetric leaf springs 92 as the one given in FIG. 13. In this embodiment, the springs consist of leafs with slits 94. The slits 94 in the leaf 92 make the leaf act as several cooperating and antagonistic double-cantilever beams and operates in at least one direction perpendicular to the leaf normal. The leafs 92 are mechanically fixed to the supporting structures at points indicated by small circles 93, i.e. essentially in front and in back of the picture as drawn. This double cantilever beam arrangement which substantially reduces parallel shifts of the beam with tangential motion gives a large stroke without much space requirements.

Figure 14:
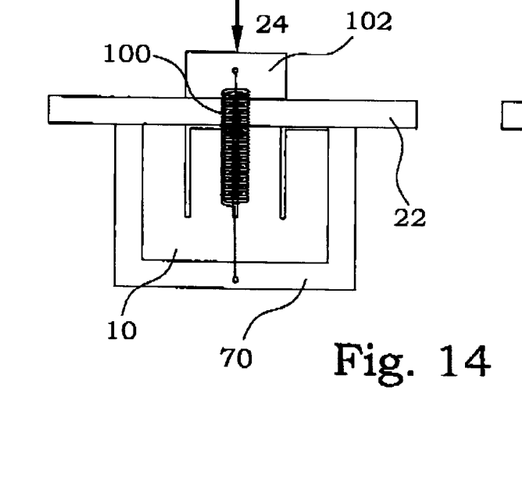
FIG. 14 illustrates an embodiment for application of a normal force.
Figure 15:
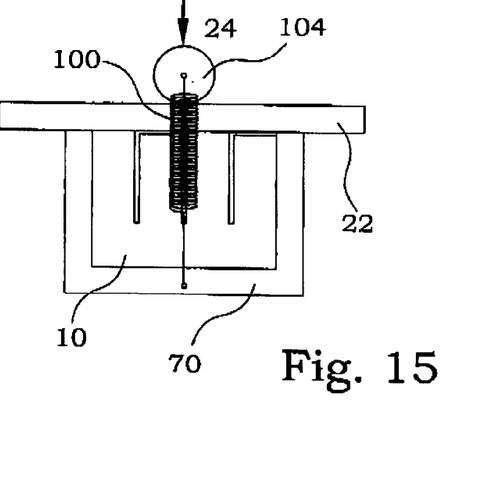
FIG. 15 illustrates another embodiment for application of a normal force.

For negligible loads it might not be necessary to have a particular guiding of the rail to get controlled motion. The rail tangential position is essentially defined by the fine walking and only simple details have to be used to keep the rail in position in the orthogonal directions. It is sufficient to supply a normal force without creating to high a tangential force. One very simple solution, as the one shown in FIG. 14, is to use a linear bearing 102 with a low friction coefficient pressed against the rail 22 with a normal force 24. The bearing 102 material could be e.g. a PTFE polymer. The normal force 24 could be created with simple springs e.g. helical springs 100 attached to a mounting module 70 of an actuator unit 10 or other mechanical parts. Other types of springs, e.g. leaf springs, with higher stiffness in the tangential direction might be needed in some applications. A somewhat more expensive solution, shown in FIG. 15, is to use a ball 104 or slide bearing to supply the normal force without creating too high tangential forces. The force itself can be adjusted with helical springs 100 or even rubber materials if the bearing 104 is fixed to the mounting module 70 by some mechanical means not shown in the figure. The rubber could be O-rings fitted to the bearing. The simple solution to keep the rail 22 in position orthogonal to the tangential direction is some type of profile on the bearings. Further, several ball or roller bearings could be used. Several ball bearings could be put along the rail. An alternative is to have free balls or rollers that are kept against the rail to be moved by another fixed profiled rail that keep the rollers/balls from moving sideways or too far lengthwise.

What should be realized is that at miniature scale, the motion range is only in the micrometer order and the rail surface has to be extremely flat. Also the height of the driving elements have to be adjusted within very small tolerances. The flatness of the rail can be made with conventional lapping and polishing techniques while the polishing of the monolithic unit has to be made according a particular procedure depending on the material chosen. A piezoceramic material should be polarized before final polishing to avoid shape changes of the material in the polished state. This is not the common technique since the monolithic unit then has to be polished with the electric carriers attached, which normally is not desired. A soft piezoelectric material does not necessarily need to be polarized before use since a short run-in will give the desired polarization. In simple motors, the drawback of uncontrolled height of the drive elements can be compensated for by the cheaper polishing sequence, and in this case our preferred solution is to not polarize the motor before use.

The exact choice of the time dependent speed vector at "grip" and "release" as well as the overlap time between the two drive element sets is crucial for opinized performance, and these aspect has been farther discussed elsewhere. If we consider the energy consumption of a non-dynamic motor, the normal motion will always be related to losses, since the losses in the materials are not negligible, even with thee most ideal drive electronics. The control of the surface flatness of both rail and contact points is therefore necessary also for efficiency purposes. The choice of materials properties in the rail is important for an optimal performance. A high Young's coefficient is advantageous for both reduction of elastic deformation in the contact points and to be able to keep a high flatness at high normal forces. Depending on application the wear of the rail might be critical, in particular when wear edges might be created. It is therefore advantageous to use a rail with higher wear resistance than the contact points of the drive elements. There is another method of reducing wear of the rail as well as of the contact points of the drive elements and at the same time reducing the need for high normal forces. The molecular forces between two surfaces become important when the spacing is very small, less than about ten nanometers, and this effect is often called "gauge block effect". With the use of a suitable gas or liquid, e.g. a lubricant, between the rail and contact surfaces of the drive elements, a high friction force can be achieved at moderate or zero normal forces without causing any wear of the surfaces. This is useful in a non-dynamic motor with extremely flat surfaces.

To be able to reach the tangential force needed in a specific application, the normal force and the friction properties between the rail and drive element contact points have to be designed properly. For most hard and stiff materials suitable for rail and drive elements the normal force has to be chosen much higher than the tangential force since the friction coefficient is less than one. Some materials though, e.g. rubber, have a rather high friction coefficient and is therefor advantageous in certain applications. The thickness of the rubber with its rather low stiffness has to be small enough to allow the drive elements to move freely. Another possibility with many advantages is to use teeth on both rail and drive elements. The normal force can then be substantially reduced and the wear will as well be reduced. A main advantage of using teeth is that open-loop positioning can be made with high precision and accuracy. The teeth can be fabricated with standard micro machining techniques of today.

There are several aspects to consider when designing a non-dynamic motor for high performance. One important aspect is the losses in the materials, which result in an increased temperature in the material. Since, for instance the piezoelectric effect disappears above the Curie temperature of a ferroelectric material, the temperature has to be kept below this limit. Most of all an increased temperature will give a heat expansion of the material, increase diffusion of various elements and affecting any polymeric components negatively. It is therefore a desire to control the temperature in the monolithic unit and one way of doing this is to add electrode layers in the passive backing since the metal has a much higher thermal conduction. Normally these layers would be connected to the earth electrode. The major cooling paths in a non-dynamic motor of the kind presented here are through the drive elements to the rail and through the electric connections to the unit. Using an integrated contact material with high thermal conduction, also the cooling path via the rail will be improved.

Figure 16:
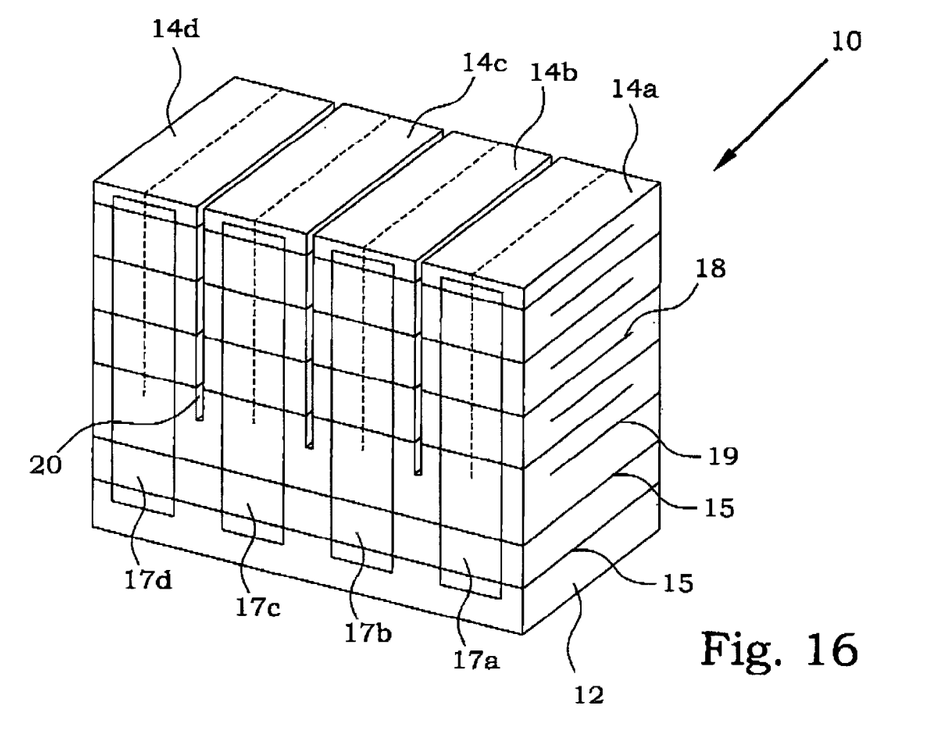
FIG. 16 illustrates an embodiment of a piezoelectric unit having contacting electrodes in the passive backing.

An important step in the fabrication sequence is to connect the monolithic unit electrically. There are several methods that can be used and there are advantages and disadvantages with each of them. As have been suggested in the international patent applications PCT/SE00/00063 and PCT/SE00/00064, the unit can be mounted on a flexible printed circuit board by either mechanical or joining techniques. As have been disclosed in PCT application PCT/SE00/00064, the contacting could be made by spring forces in the flexible carrier, which would allow for disassembling after e.g. polarization. A permanent solder joint could be made at a later stage. The common surface mounting technique of screen-printing or dispensing of the solder prior to placing the component, in our case a monolithic unit, on top of the flexible carrier is highly advantageous in large-scale production. The monolithic unit could be put with the driving elements normal to the flexible carrier or parallel to the flexible carrier. One advantage with the normal placement is that electrodes on both sides, both phase and earth electrodes, of the monolithic unit can be contacted easily at the same time. The disadvantage is that the whole unit will have a polymer as mechanical support in the normal direction. If the monolithic unit is placed parallel to the flexible carrier surface, there is the possibility to have a rigid and stiff support on the backside. In this case the earth contacting has to be made at the same side as the phases or there has to be some smart contacting to the backside. If we consider FIG. 16, the backside of a unit 10 similar to the one shown in FIG. 1 is seen. Additional electrode layers 15 have been introduced in the passive backing part 12. These layers are used to make it possible to contact earth electrodes 17a–d from the (not shown) "front" side of the unit 10. Another solution is to divide the flexible carrier so that one portion of the carrier can reach the other side. There are several details to consider regarding the final contacting against the flexible carrier. In some applications, the earth electrodes 17a–d should preferably be divided in the same manner as the phase electrodes 14a–h (FIG. 1), which also could reduce the number of masks needed in a screen-printing process.

The earth electrodes could as well be completely separate which in this example would end up with a 16-wire motor. Normally the earth electrodes are connected, though, and there are two main wire alternatives. Either all phases are kept separated, which gives a 9-wire motor, or the phases belonging to the sets operating synchronously are connected, which gives a 5-wire motor. A 5-wire motor can be considered as a 4-phase motor. If we consider one of the phases in element a, this phase is connected to another phase in elements c or in d. The first alternative gives the same distance between the driving elements operating synchronously and the second alternative gives a symmetry regarding the center of the unit. The center symmetry arrangement, i.e. the left phase in the a element is connected to the left phase in the d element, the right phase in the a element is connected to the right phase in the d element etc., is preferred. With an 8-phase motor (9 wires) it is possible to make minor adjustments of height position, due to fabrication errors etc., of the different element contact points by the addition of a bias voltage to the corresponding phases. For instance, if the drive element a is found to be 0.1 μm below desired value, a bias voltage corresponding to this elongation can be added to phases a and b in this element for compensation.

It will be understood by those skilled in the art that various modifications and changes may be made to the present invention without departure from the scope thereof, which is defined by the appended claims.

Description of Common Driving Mechanisms

Several different motors based on electromechanical materials have been proposed and some of these have been commercialised. To distinguish the various driving mechanism that has been disclosed in various articles and patent applications, the mechanisms can be divided according to physical principles and in particular regarding the importance for mature motors, Further sub-divisions are possible. A brief description of the different mechanisms is presented below, The first division of driving mechanisms is made between dynamic mechanisms and non-dynamic mechanisms. By using the inertia of some motor component and/or time dependent physical effects, various electromechanical motors based on dynamic mechanisms can be realized. Typically, the motors can only operate in a certain frequency range with no operation at low internal speed or frequency. The commonly encountered names ultrasonic and travelling wave motors belong to the group dynamic mechanisms where the latter is a particular example of a motor based on mechanical resonance.

The main part of motors constructions disclosed are based on mechanical resonance of either the piezoelectric material itself or a structure mechanically coupled with the piezoelectric material. The driven component is moved by intermittent cyclic contact with the resonating surface or elements. In a travelling wave motor there will always be contact between the driven component, normally a rotor, and some of the resonating elements. The major interest in this mechanism is connected to the potential for energy saving and motion magnification. An active structure in resonance can move with little consumption of energy, which theoretically could be used in a highly efficient motor. Depending on how easy it is to bring the structure in resonance, a smaller or larger motion amplification can by obtained. Motion magnification is important when the dimensions are reduced and the clearance between the mechanical parts is small. Disadvantages in practice are the relatively high wear and difficulties in approaching a large motion range of the resonating parts without failure.

Some motors use inertial effects. The driven component is moved by intermittent friction contact with the actuator element in a cyclic manner. The inertia of the driven componentor some other parts in the motor, is chosen so that the actuator elements are able to move freely, normally by fast and two-dimensional motion, to another contacting position. One cycle consists of creating dynamic contact, movement of the driven component, dynamic release and return to start position. The dynamic nature makes it necessary to keep the cycle frequency within a certain range. The inertial mechanism will become an impact mechanism if the contacting time is short in relation to the cycle time. One important advantage with this mechanism is that in applications with short lifetimes and medium forces there are moderate demands on the surface to be in contact. Due to the dynamic motion this mechanism are inferior to a non-dynamic mechanism regarding positioning and resolution.

Stick-slip mechanisms are particular inertial mechanisms where the increase in friction coefficient at zero relative velocity between actuator elements and the driven component is utilised. Two-dimensional motion of the actuator elements is not necessary in this case. Since the friction coefficient (normally) is higher at zero relative velocity, the desired motion of the driven component is made with the actuator at a force less than the frictional force. The actuator is moved back at high speed with an initial high acceleration. The acceleration of the actuator is chosen high enough to case slippage between actuator and component to be moved. The inertia of the driven component is hence utilised. The main advantage is the simple construction and the main disadvantages are the wear of the components and the uncontrolled nature of the mechanism.

In particular early constructions presented or disclosed for piezoelectric motors were based on impact mechanisms. Generally, a part of the mechanical momentum is transferred from an oscillating actuator to the moving part. An advantage is an easy construction but there are several disadvantages including problems with changing direction of motion and wear.

The non-dynamic mechanisms are characterised in that the motion can be made at arbitrarily low frequencies or speed of the active elements. The driven component is moved by actuator elements which make motion cycles consisting of sequences such as grip, move, release and return. When one element (set) is releasing, another (set on element will grip the driven component. This means that at least two gripping elements (or groups of elements) have to be provided, configured for providing an alternating gripping—releasing function. The upper limit of the non-dynamic mechanisms is typically a cycle frequency where mechanical resonance of the actuator elements will substantially influence the movement of the elements, i.e. the quasi-static limit. Typically the non-dynamic mechanisms are advantageous where controlled positioning is desired at low to medium-high speeds. Further this mechanism allows for easy optimisation in various applications and gives the possibility to deliver high forces. The main disadvantage is the demands on the construction in order to achieve the desired mechanism. Various solutions to simplify the constructions without losses in performance are therefore of great commercial interest. The below disclosed mechanisms for non-dynamic motion are the inchworm mechanism and a mechanism utilising cilia drive elements.

In the "inchworm" mechanism, the driven component is moved by mechanical steps in a clamp-extend-clamp fashion. There has to be at least two sets of clamping elements that move out of phase. The clamping elements are connected to a central extention tube that move the driven component. In between each motion, the extention, the driven components is clamped by both sets of elements and stands still.

With use of a cilia mechanism, mechanical stepping can be made with drive elements that are only able to move one-dimensionally. Essentially two sets of elements operating out of phase are needed. One set is able to move in a direction in between the normal and tangential direction. The other set is also able to move in a direction in between the normal and tangential direction, but typically mirror imaged, with respect to the normal axis, relative the first set. If the first set is raised the driven component is moved both normally and tangentially. The second set is raised to contact the driven component and then the first set is lowered. When the second set is lowered the driven components moves in the same direction as was achieved with the first set. Change of direction is achieved by change of phase between the two sets.

It is also possible to create motion by mechanisms that are essentially non-dynamic in the contact with the body to be moved, but involves certain parts with a dynamic character. Such a mechanism can be used for controlled walking and is based on two sets of elements where the set in contact with the driven component is operating (quasi-) static and the set which is not in contact with the driven component is operating in a more dynamic manner. Typically, the elements which are not in contact with the driven component use the inertia of the element and/or other components to make a fast return from a release to the grip sequence. The driven component can hence be moved at arbitrarily low speeds but the frequency or speed of the return sequence has to be sufficiently high for the element to be able to move freely. Such a mechanism can be called pseudo-static.

What is claimed is:

1. Electromechanical actuator arrangement, comprising:
   a plurality of drive elements to be driven according to a walking driving mechanism, said drive elements having at least two phase electrodes each, connecting corresponding phase segments; and
   a driving device, said driving device in turn comprising:
      electrical power source;
      at least two switches connected in series between terminals of said electric power source;
      whereby at least a first of said phase electrodes being connected to a point between said switches; and
      control unit connected to control said switches to charge/discharge said phase segments of said drive elements.

2. Electromechanical actuator arrangement according to claim 1, further comprising a resistor connected in series with said first phase segment.

3. Electromechanical actuator arrangement according to claim 2, wherein two sets of said two switches are comprised in a motor control unit for inductive loads, whereby a first terminal of said motor control unit is connected to a first phase segment, and a second terminal of said motor control unit is connected to a second phase segment.

4. Electromechanical actuator arrangement according to claim 1, further comprising a first inductor connected in parallel with said first phase segment, forming a parallel resonance circuit.

5. Electromechanical actuator arrangement according to claim 4, further comprising a second inductor and a capacitive element connected in series with said parallel resonance circuit, forming a serial resonance circuit.

6. Electromechanical actuator arrangement according to claim 5, wherein two sets of said two switches are comprised in a motor control unit for inductive loads, whereby a first terminal of said motor control unit is connected to a first phase segment, and a second terminal of said motor control unit is connected to a second phase segment.

7. Electromechanical actuator arrangement according to claim 4, wherein two sets of said two switches are comprised in a motor control unit for inductive loads, whereby a first terminal of said motor control unit is connected to a first phase segment, and a second terminal of said motor control unit is connected to a second phase segment.

8. Electromechanical actuator arrangement according to claim 1, wherein two sets of said two switches are comprised in a motor control unit for inductive loads, whereby a first terminal of said motor control unit is connected to a first phase segment, and a second terminal of said motor control unit is connected to a second phase segment.

9. Electromechanical actuator arrangement according to claim 1, wherein said drive elements are active portions of a monolithic body connected by passive portions of said monolithic body, and that said passive portion further comprises additional electrode layers.

10. Electromechanical actuator arrangement according to claim 9, wherein said additional electrode layers are connected to ground, for improving thermal conductivity.

11. Electromechanical actuator arrangement according to claim 1, wherein driving portions of said drive elements are made by a material with high thermal conductivity.

12. Electro mechanical actuator arrangement according to claim 1, wherein said control unit is arranged to control the switch on and switch off of said switches individually.

13. Electromechanical actuator arrangement according to claim 12, wherein said control unit is arranged to enable said switches to be in an off state at the same time.

14. Electromechanical actuator arrangement according to claim 12, wherein said control unit is further arranged to individually control opening and closing times of said switches.

15. Electromechanical actuator arrangement according to claim 14, wherein said control unit is further arranged to create fractional portions of drive element trajectories.

16. Electromechanical actuator arrangement according to claim 14, wherein said control unit is further arranged for causing an incomplete charging of one or more phase segments during a trajectory segment, whereby a reduced step length of said drive elements is achieved.

17. Method for driving an electromechanical actuator arrangement, having a plurality of drive elements driven according to a walking mechanism, comprising the step of:

providing voltages over phase electrodes, connecting corresponding phase segments of said drive elements, said step of providing voltages in turn comprising the steps of:

switching at least two switches, being connected in series between terminals of an electric power source, said phase electrodes being connected to a point between said switches, whereby said switching results in charging or discharging of the capacitance of said phase segments, wherein switching on and off of a first one of said switches is independent of operation of a second one of said switches and switching on and off of said second one of said switches is independent of operation of said first one of said switches; and causing a resonance between the capacitance of a first phase segment and a first inductor connected in parallel with said first phase segment.

18. Method according to claim 17, wherein said resonance also includes a second inductor and a capacitive element connected in series with the parallel resonance circuit of said first phase segment and said first inductor.

19. Method for driving an electromechanical actuator arrangement, having a plurality of drive elements driven according to a walking mechanism, comprising the step of:

providing voltages over phase electrodes, connecting corresponding phase segments of said drive elements, said step of providing voltages in turn comprising the steps of:

switching at least two switches, being connected in series between terminals of an electric power source, said phase electrodes being connected to a point between said switches, whereby said switching results in charging or discharging of the capacitance of said phase segments, wherein switching on and off of a first one of said switches is independent of operation of a second one of said switches and switching on and off of said second one of said switches is independent of operation of said first one of said switches;

controlling charging/discharging time of said phase segments, in turn comprising the step of controlling opening and closing times of said switches; and causing an incomplete charging of one or more of said phase segments during a trajectory segment, resulting in a reduced step length.

20. Method according to claim 19, comprising the further step of dividing a segment of a trajectory of a drive element into fractional portions.

* * * * *